United States Patent [19]

Liu

[11] 4,204,167

[45] May 20, 1980

[54] ELECTRONIC TIME PIECE AUTOMATIC CALIBRATING DEVICE

[76] Inventor: Yung-Ho Liu, 4th Fl., No. 6, La. 1, 10th St., Houkong, Shihlin, Taipei, Taiwan

[21] Appl. No.: 909,281

[22] Filed: May 24, 1978

[51] Int. Cl.[2] ......................... H04B 1/16; G04C 11/02

[52] U.S. Cl. ...................................... 455/231; 455/51; 368/47

[58] Field of Search ................... 325/58, 395, 396, 37, 325/363, 364, 466; 340/147 SY; 343/225; 58/24 R, 35 W, 26 R

[56] References Cited

U.S. PATENT DOCUMENTS

| | | | |
|---|---|---|---|
| 1,869,175 | 7/1932 | Sprague | 58/35 W |
| 2,005,158 | 6/1935 | Nicolson | 58/35 W |
| 3,323,025 | 5/1967 | Sugano et al. | 325/396 |
| 3,626,687 | 12/1971 | Fondiller et al. | 58/24 R |
| 3,748,846 | 7/1973 | Kikuchi | 58/35 W |

*Primary Examiner*—Marc E. Bookbinder
*Attorney, Agent, or Firm*—Blair, Brown & Kreten

[57] ABSTRACT

An automatic timepiece calibrating device which utilizes the time signal given by any broadcasting station to provide calibration automatically once every 24 hours, a logic electronic timer device being adapted to switch on a receiver once in every 24 hours so that the receiver will generate an impulse immediately after receipt of a time signal from a broadcasting station. The time signal is passed by means of a tuning circuit and converted to impulses which are counted and, if the count corresponds to the signal the counter output impulse resets the internal state of electronic timepiece so that the time display is restarted from zero.

5 Claims, 2 Drawing Figures

ELECTRONIC TIME PIECE AUTOMATIC CALIBRATING DEVICE

BACKGROUND OF THE INVENTION

The timepiece has a long history. However, neither a hanging clock on the wall nor a wrist watch will keep time precisely. Even the latest logic electronic timepiece can not keep time accurately. Manual calibration with reference to mean Greenwich Time is still necessary. Recently, the time signal given by the Greenwich Time Station has been used for the calibration of mechanical timepieces once an hour which makes the timepiece as accurate as possible.

SUMMARY OF THE INVENTION

The invention comprises a system which receives the time signal given by any broadcasting station at midnight and converts it to an impulse. The impulse resets the internal state of a logic electronic timepiece so that the time display is restarted from zero. Regardless of the existing time display on the timepiece, the internal state of the timepiece is reset and the timepiece is restarted from the start point at 00:00 (Mean Time) everyday. In other words, the invention is not exactly a calibration device but, actually it eliminates the previous time display so that the timing is restarted at the very beginning.

Generally, a broadcasting station transmits a time signal at a constant frequency. Therefore, a corresponding tuning circuit has to be used for passing that signal. The device of the invention receives the time signal and converts it into an impulse. Then, the impulse resets the internal state of the timing circuit. However, we are not able to assure that some ordinary audio signal will not produce the above-mentioned constant frequency time signal a few minutes prior to the 00:00 starting point after the switching on of the receiver and prior to the appearance of actual time signal. Therefore, it is necessary that the number of cycles in the time signal be counted after having been received. In case the cycle count conforms to the approximate cycle count at the last cycle of the time signal given by the broadcasting station, then the circuit outputs a High which resets the state of the timing circit at that time. Otherwise, no High will be outputted and the disturbance of the time signal frequency by some other audio frequency is prevented.

DESCRIPTION OF THE PREFERRED EMBODIMENT

The principle of operation of the invention is set forth below with reference to the circuit of FIG. 1.

(1) D is a well-known electronic timing circuit or timepiece. The timepiece D is designed to output a High at a at a few minutes prior to midnight, for instance, at 11:50 O'clock. The High at a will be maintained until a High appears at the Reset terminal of D which clears the state of D and a returns to a Low. When there is a High at a, the current strength of such a High is raised through an operational amplifier OP1. Then, the relay RL functions, and closes switch K. Then, receiver A is connected to a source of power such as battery E and receiver A is in a receiving state, ready to clear D and cause it to start timing from the beginning.

(2) Point e is the audio frequency signal output terminal of receiver A. Capacitor C2 and inductance L consititute a time signal frequency tuning circuitry which is coupled to e through a resistor and capacitor C1. The base of transistor Q1 will have an input only upon the appearance of the time signal, and vice versa. During the appearance of the time signal, there is an input to the base of Q1, which causes Q1 to conduct raising the current strength which from the emitter of Q1 is fed to the base of transistor Q2. The collector of Q2 is connected to an inverter n whose output is an impulse which has the same frequency as that of the time signal.

(3) When there is no output impulse from n (normally, output of n is Low), the output from the collector of transistor Q3 is always High. Therefore, the Reset terminal of counter B is High at which counter B is zero.

However, when there are consecutive impulses outputted from n, the current strength is raised through operational amplifier OP2, $C_3$ and resistor R will filter the impulses to provide stable output voltage and saturate transistor Q3 so the voltage of the collector of Q3 drops to zero. Then, the output impulses can be counted at counter B.

(4) The counter B is of the type which outputs a High at b when the count of input impulses is approximately equal to the number of cycles of the time signal. Otherwise, the output b always is Low. Therefore, if a High appears at b the electronic timepiece D is cleared restarted from the beginning.

Furthermore, since the frequency of the time signal from a certain broadcasting station may be different from that of others, the capacitance (or inductance) of the tuning circuit (C2 and L) which passes the time signal and the predetermined impulse count of counter B must be variable to facilitate the application of the invention.

Figure 1:
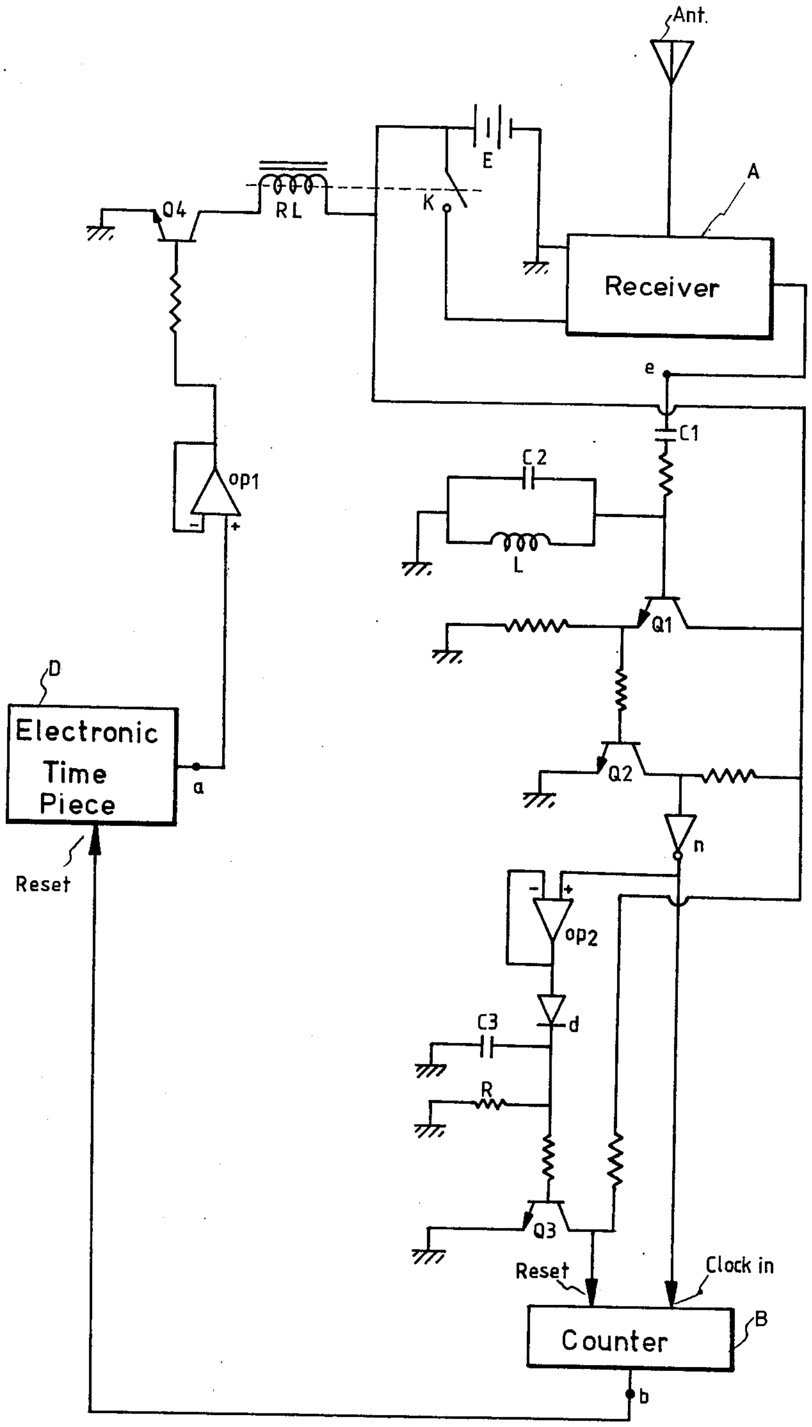
FIG. 1 is a schematic diagram of the circuit of the invention.
Figure 2:
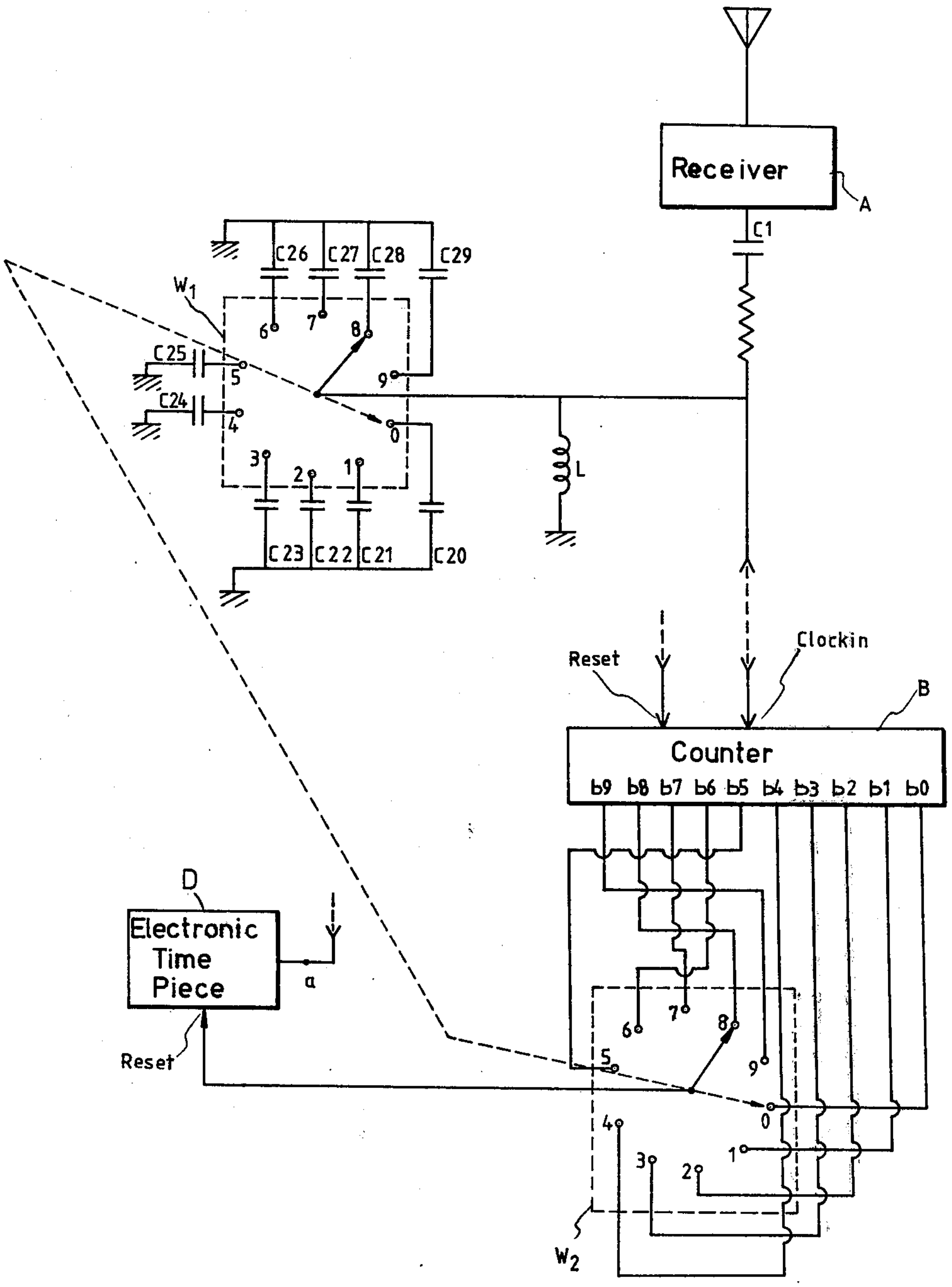
FIG. 2 is a schematic diagram illustrating a modification of the circuit of FIG. 1.

As indicated by FIG. 2, tuning capacitor C2 is the circuit of FIG. 1 and is replaced by capacitors C20–C29 which are selected by means of a rotary switch W. Counter B in the circuit of FIG. 1, has only one output b but has ten outputs b0–b9 in the circuit of FIG. 2. Each of the outputs b0–b9 can be selected by another rotary switch W2 and then enter the Reset terminal of D (electron timepiece); each bi (i=0, 1, . . . 9) output represents a specific number of counted impulses in counter B. Each of the outputs b0–b9 matches the time signal frequency of a specific broadcasting station. $W_1$ and $W_2$ are rotatable in a coaxial relationship.

I claim:

1. An electronic timepiece calibrating device comprising, in combination, a receiver for receiving a time signal from a broadcasting station, an electronic timepiece having resetting means for returning said timepiece to a zero setting, means controlled by said electronic timepiece for energizing said receiver, means connected to said receiver for converting the time signal from said receiver to a series of impulses, means for counting said series of impulses and for generating an output pulse when said series of impulses correspond in number to the frequency of said time signal and means for feeding said output pulse to said electronic timepiece to actuate said resetting means.

2. A timepiece calibrating device in accordance with claim 1 including a tuning circuit connected to the output of said receiver, said tuning circuit having a resonant frequency corresponding to the frequency of said time signal.

3. A timepiece calibrating device in accordance with claim 2 wherein said counting means includes a counter having an output connected to said timepiece resetting means, said counter having a pair of inputs, clocking means connected to one of said inputs and means for feeding said series of impulses to the other of said counter inputs.

4. A timepiece calibrating device in accordance with claim 3 including means for selectively varying the resonant frequency of said tuning circuit.

5. A timepiece calibrating device in accordance with claim 4 wherein said counter is provided with a plurality of outputs, each of said outputs having means for matching the time signal frequency of a specific broadcasting station and means for selecting one of said counter outputs and for feeding the output impulse from a selected one output to said resetting means in said timepiece.

* * * * *